Aug. 13, 1929.  G. V. GAVAZA  1,724,131
ADAPTER FOR SMOOTH FACED FAUCETS
Filed June 16, 1926
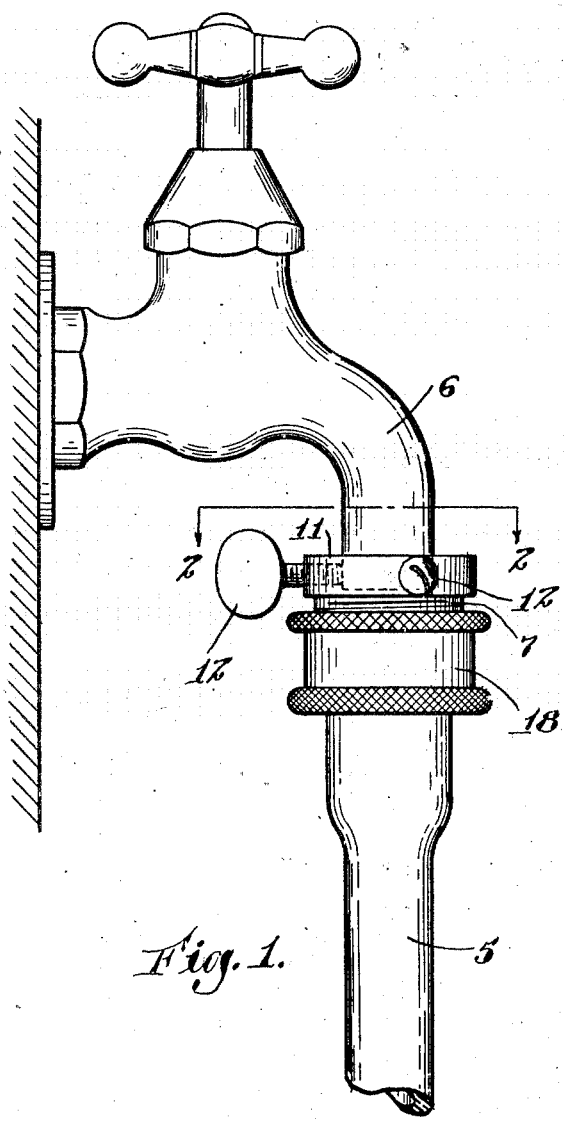
Fig. 1.
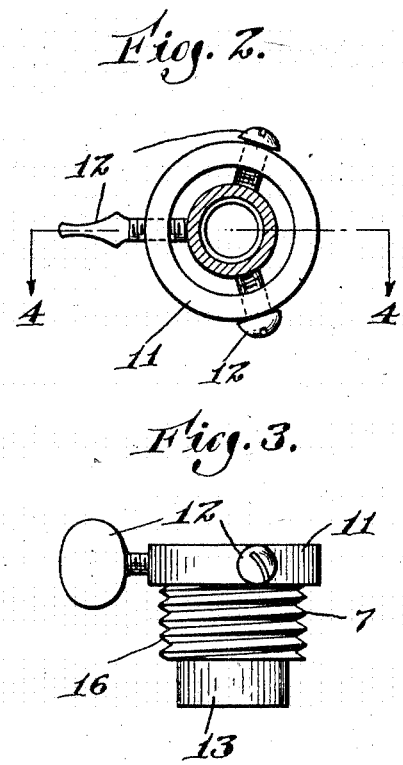
Fig. 2.
Fig. 3.
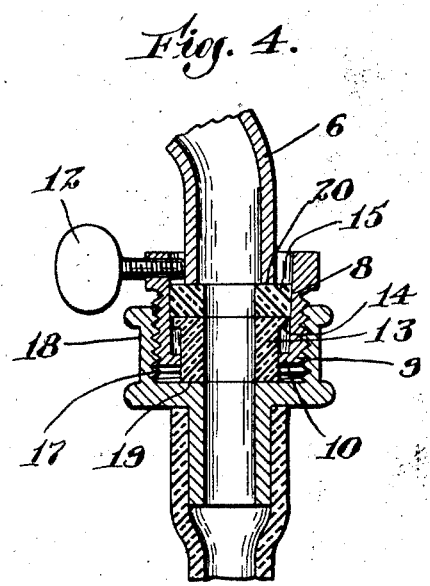
Fig. 4.
Inventor
George V. Gavaza
by Charles W. McDermott
his Attorney Patented Aug. 13, 1929.

1,724,131

UNITED STATES PATENT OFFICE.

GEORGE V. GAVAZA, OF QUINCY, MASSACHUSETTS.

ADAPTER FOR SMOOTH-FACED FAUCETS.

Application filed June 16, 1926. Serial No. 116,495.

The present invention relates to means for connecting a pipe or hose to a smooth-faced faucet.

Most sinks in kitchens and tubs in bathrooms are provided with smooth-faced faucets. It is often desirable to connect these faucets to a hose whereby machines, such as clothes or dish washing machines may be filled from the sink faucet or whereby a spray nozzle may be used from the bath tub faucet. These smooth-faced faucets have no standard design, the mouths thereon varying in shape with the different manufacturers thereof. Accordingly, it is difficult and often impossible to connect a pipe or hose to the smooth-faced faucet without leakage.

The object of the present invention is to provide means for connecting a pipe or hose to any kind of a smooth-faced faucet whereby the connection may be made in a reliable and certain manner.

To the accomplishment of this object, and such others as may hereinafter appear, the various features of the present invention relate to certain devices, constructions and arrangements of parts as fully set forth hereinafter, the advantages of which will be readily understood by those skilled in the art.

The various features of the present invention will be readily understood from an inspection of the accompanying drawings illustrating the best form of the invention at present known to the inventor, in which, Figure 1 is an elevation showing a hose connected to a smooth-faced faucet;

Fig. 2 is a sectional plan on the line 2—2, Fig. 1,

Fig. 3 is an elevation of the adapter, and

Fig. 4 is a sectional elevation on the line 4—4, Fig. 2.

The drawings illustrate a hose 5 connected to a smooth-faced faucet 6. To this end an adapter 7 (Fig. 3) is removably secured to the smooth-faced faucet 6. As shown the adapter 7 comprises a shell 8 the interior of which is slightly frusto-conical in formation having on its smaller base 9 an inturned lip 10 (Fig. 4). The periphery of the adapter 7 near its larger base 11 carries three screws 12, two of which are slotted and one of which is provided with a finger head. By means of these screws 12 the adapter 7 is removably secured to the smooth-faced faucet 6.

Within the shell 8 the adapter carries a perforated rubber washer 13 provided with an annular shoulder 14 which, when the adapter is not in use, rests upon the inturned lip 10. Arranged on top of the washer 13 is a second perforated washer 15. The washer 15 has a greater degree of elasticity than the washer 13 being made preferably of sponge rubber.

The adapter 7 is provided with external screw threads 16 which receive internal screw threads 17 on a coupling 18 provided with an internal shoulder 19. The coupling 18 carries the hose 5.

To make the connection the adapter 7 is first secured to the smooth-faced faucet 6. The coupling 18 is then screwed on to the threads 16. This causes the shoulder 19 to lift the washer 13 upwards within the shell 8 thus compressing the sponge rubber 15 between the mouth 20 of the faucet and the washer 13. During its compressing movement the washer 15 automatically adapts itself to the shape of the mouth 20. With this construction the washer 13 prevents leakage around the shoulder 19 while the washer 15 prevents leakage around the mouth 20 notwithstanding the shape thereof. While the drawings illustrate a mouth 20 which is normal to the direction of flow of the water therethrough it must be understood that in many faucets the mouths are offset from a normal position. No matter what shape the mouth may take the sponge rubber 15 will automatically seat itself thereby adapting itself to the shape of the mouth.

When the coupling 18 is unscrewed from the adapter 7 the compressed washer 15 returns to its normal expanded condition thus forcing the return of the washer 13 to its original position with the shoulder 14 resting on the lip 10.

In securing the adapter 7 to the faucet 6 and also in removing the adapter therefrom it is only necessary to manipulate the screw provided with the head. The slotted screws project inwardly above the washer 15 thus preventing its accidental dropping from the adapter.

It will be clear to those skilled in the art, and with the general objects of the present invention in view, that changes may be made in the details of structure, the described and illustrated embodiment thereof being intended as an exploitation of its underlying essentials the features whereof are definitely stated in their true scope in the claims herewith.

What is claimed as new, is:

1. An adapter for use in connecting a pipe or hose to a smooth-faced faucet comprising a shell having on one face an inturned lip, a rubber washer having an annular shoulder arranged to rest upon the lip, and a second washer of rubber substantially softer than the first named washer arranged to rest thereon.

2. An adapter for use in connecting a pipe or hose to a smooth-faced faucet comprising a frusto-conical shell having on its smaller base an inturned lip, a perforated cylindrical rubber washer having on one face an annular shoulder arranged to rest upon the lip, and a second perforated cylindrical washer of rubber substantially softer than the first named washer arranged to rest thereon.

In testimony whereof I have signed my name to this specification.

GEORGE V. GAVAZA.